US006471188B2

(12) United States Patent
Crawford

(10) Patent No.: US 6,471,188 B2
(45) **Date of Patent: *Oct. 29, 2002**

(54) APPARATUS AND A METHOD FOR USE IN HANDLING A LOAD

(75) Inventor: Alexander Charles Crawford, Newport-on-Tay (GB)

(73) Assignee: Deep Tek Limited, Dundee (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/896,291

(22) Filed: Jun. 29, 2001

(65) Prior Publication Data

US 2001/0042857 A1 Nov. 22, 2001

Related U.S. Application Data

(63) Continuation of application No. 09/274,259, filed on Mar. 22, 1999, now Pat. No. 6,267,356, which is a continuation-in-part of application No. 08/875,249, filed on Jul. 21, 1997, now abandoned.

(30) Foreign Application Priority Data

Jan. 25, 1995 (GB) ............................................ 9501475

(51) Int. Cl.$^{7}$ .......................... B66D 1/00; H02G 11/00; B65H 75/38

(52) U.S. Cl. ...................... 254/266; 191/12.2; 242/406; 414/918

(58) Field of Search ................................ 254/266, 251, 254/332; 212/271, 279, 238, 240, 243, 251, 332; 191/12 R, 12.2 R, 12.4; 242/406; 294/65.5, 64.1; 414/918

(56) References Cited

U.S. PATENT DOCUMENTS

| | | | | |
|---|---|---|---|---|
| 3,858,845 A | 1/1975 | Giote et al. | 254/266 |
| 3,973,656 A | 8/1976 | Zumbro | 191/12 R |
| 4,384,688 A | 5/1983 | Smith | 191/12.2 R |
| 4,659,276 A | 4/1987 | Billett | 212/251 |
| 5,240,092 A | 8/1993 | Eachus | 414/918 |

FOREIGN PATENT DOCUMENTS

| | | | |
|---|---|---|---|
| CH | 473 047 | 5/1969 | |
| DE | 643 817 | 3/1937 | |
| DE | 908876 | 7/1949 | 192/12 R |
| DE | 2 350 352 | 4/1975 | |
| DE | 3 741 192 | 6/1989 | |
| DE | 9 403 464.8 | 6/1994 | |
| FR | 2 519 181 | 7/1983 | |
| GB | 691817 | 5/1953 | 191/12.2 R |
| SU | 493845 | 3/1976 | 192/12 R |
| SU | 609159 | 5/1978 | |

OTHER PUBLICATIONS

Laco Brochure.

*Primary Examiner*—Emmanuel Marcelo
(74) *Attorney, Agent, or Firm*—Drinker Biddle & Reath LLP

(57) ABSTRACT

Apparatus and a method for use in handling a load includes a load-bearing rope and a mechanism for paying out and recovering the rope. There is also a drum for holding a service cable with a length of the service cable extending from the drum. A wrapping device rotates the length of service cable around the rope as the rope is payed out to wrap the service cable around the rope, and to unwrap the service cable from the rope as the rope is recovered.

38 Claims, 20 Drawing Sheets

177
178
177d
200
207
205
191
220
201
200
202
170
17
185
191
203
35
151
203
15
205
179
176
175
180
206
210
215
211
210
212
190

APPARATUS AND A METHOD FOR USE IN HANDLING A LOAD

This application is a continuation of prior application Ser. No. 09/274,259 filed Mar. 22, 1999 now U.S. Pat. No. 6,267,356 which is a continuation-in-part of prior application Ser. No. 08/875,249 filed Jul. 21, 1997, now abandoned.

This invention relates to apparatus for use in handling a load which is capable of raising and lowering, or of towing, a load and also handling service cables and/or hoses connected to the load. The invention is particularly, but not exclusively, applicable to the handling of subsea equipment such as grabs.

Hitherto, providing services to underwater equipment has required the provision of a specific bundle of cable(s) and/or hose(s) dedicated to each application. For some applications, it is known to incorporate the service bundle within an armoured hoist rope. This approach has a number of deficiencies. The resulting rope is costly, gives inferior hoisting properties, and by virtue of limitations on the diameter of rope which can be handled the services which can be incorporated are limited. Further, in practice it is impossible with this arrangement to add to the length of the rope or to join different types of materials, for example wire ropes with fibre ropes.

In accordance with an aspect of the present invention, apparatus for use in handling a load comprises a load-bearing rope, a mechanism for saying out and recovering the rope, a drum for holding a service cable with a length of the service cable extending therefrom, and a wrapping device for rotating said length of service cable around the rope as the rope is payed out to wrap the service cable around the rope, and to unwrap the service cable from the rope as the rope is recovered.

In accordance with another aspect of the present invention, a method of handling a load comprises paying out a load-bearing rope and wrapping a service cable around the rope as it is payed out, and subsequently unwrapping the service cable from the rope as the rope is recovered.

The term “service cable” is used herein to denote a flexible elongate member used for conveying power or data, such as an electrical cable, a fibre optic cable, or a pneumatic or hydraulic hose.

Preferably, the service cable is wrapped helically around the rope.

Typically, the load-bearing rope will be a hoist rope used for raising and lowering a load. Alternatively, the load-bearing rope may be a towing rope used for paying out, towing and recovering a load such as a marine sensor array.

The apparatus may include a plurality of service cables each extending from a respective drum.

Preferably, the mechanism for paying out and recovering the rope comprises a rope winch, from which the rope passes over a rope sheave and thereafter extends to the load along a substantially straight axis.

The wrapping device may comprise the or each service cable drum being arranged for rotation about a drum axis which coincides with said axis, the drum typically having a central aperture through which the load-bearing rose passes, said length of service cable preferably passing over a service cable sheave which is mounted for movement in a circular path around said axis.

Alternatively, the or each service cable drum may be rotatable on a structural member which is arranged for movement in a circular path about said axis.

The hoist rope winch, the or each service cable drum, and the wrapping device may conveniently each have a respective driving motor; they could however be driven by a single source through appropriate mechanical linkages.

Examples of apparatus and a method for use in handling a load in accordance with the invention will now be described with reference to the drawings, in which.

Figure 8A:
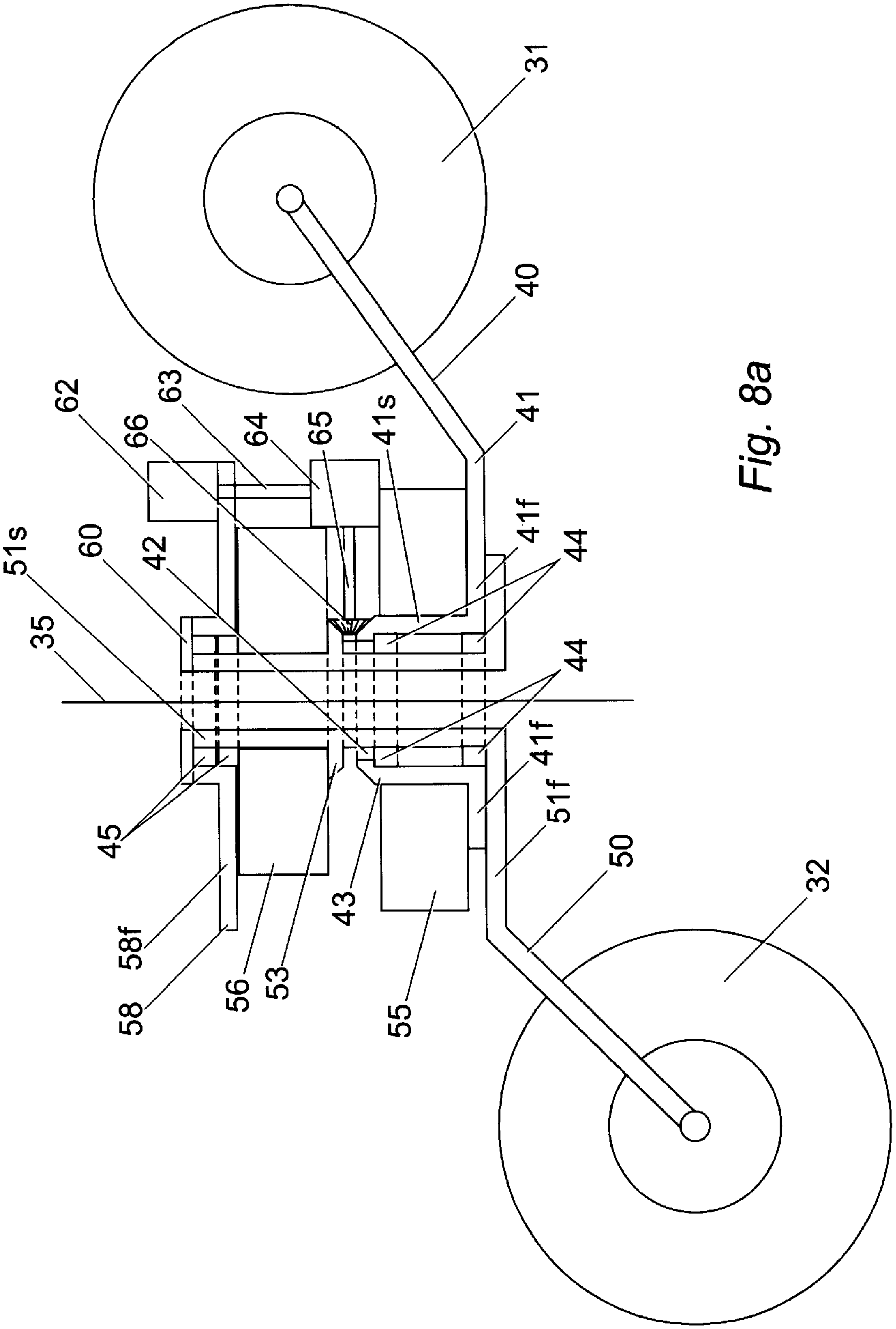
Figure 8B:
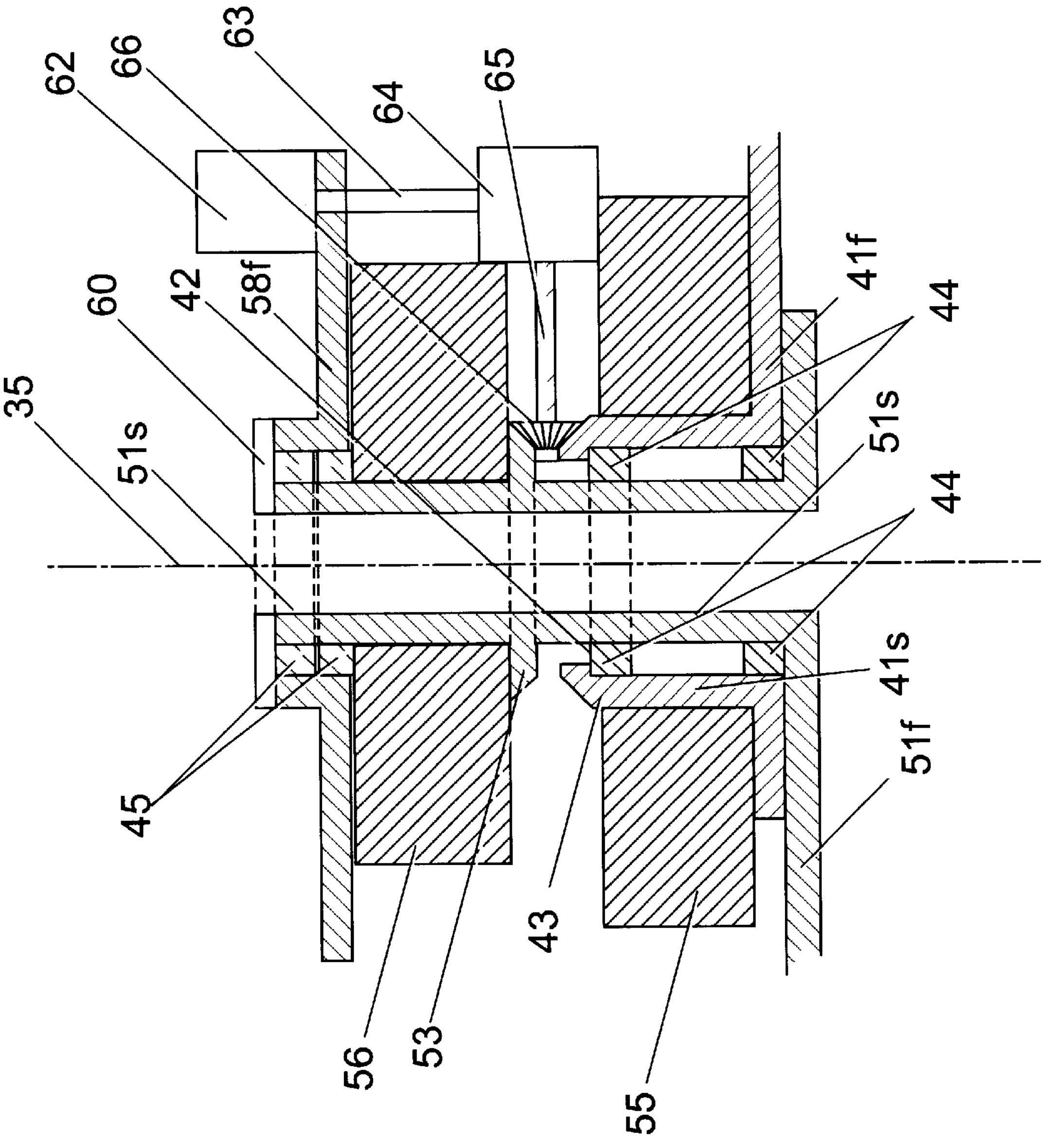
Figure 8D:
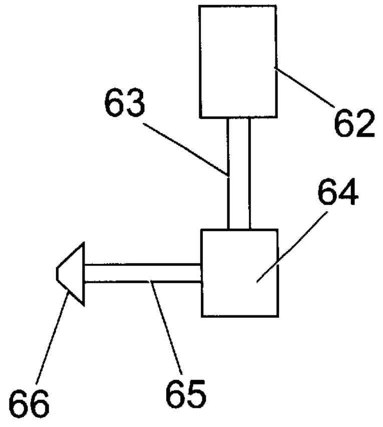
Figure 8C:
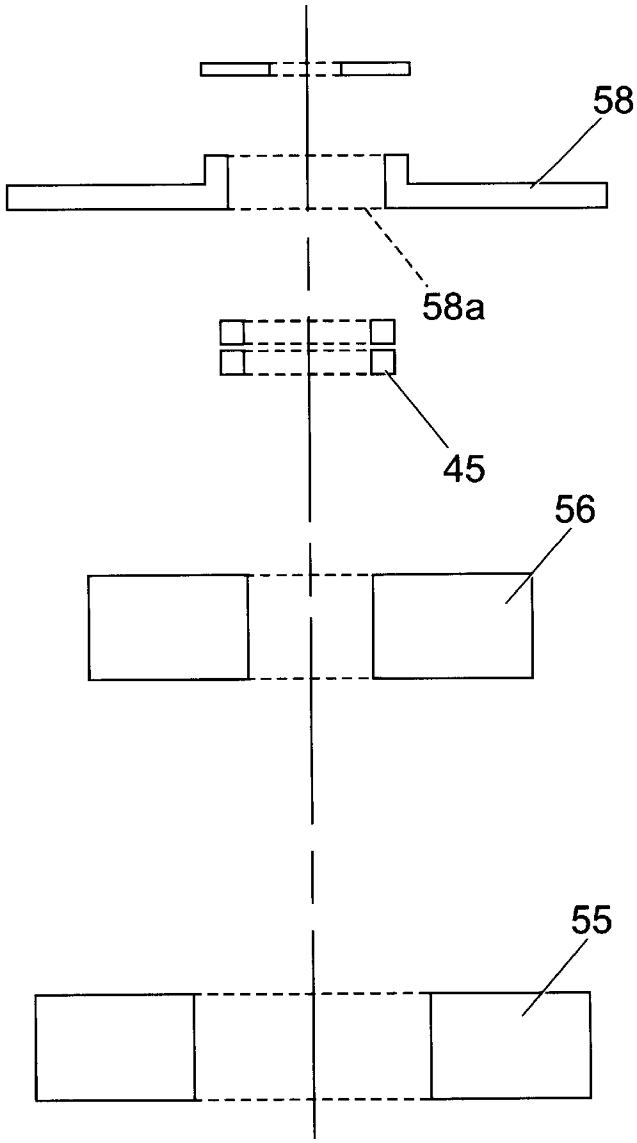
Figure 9A:
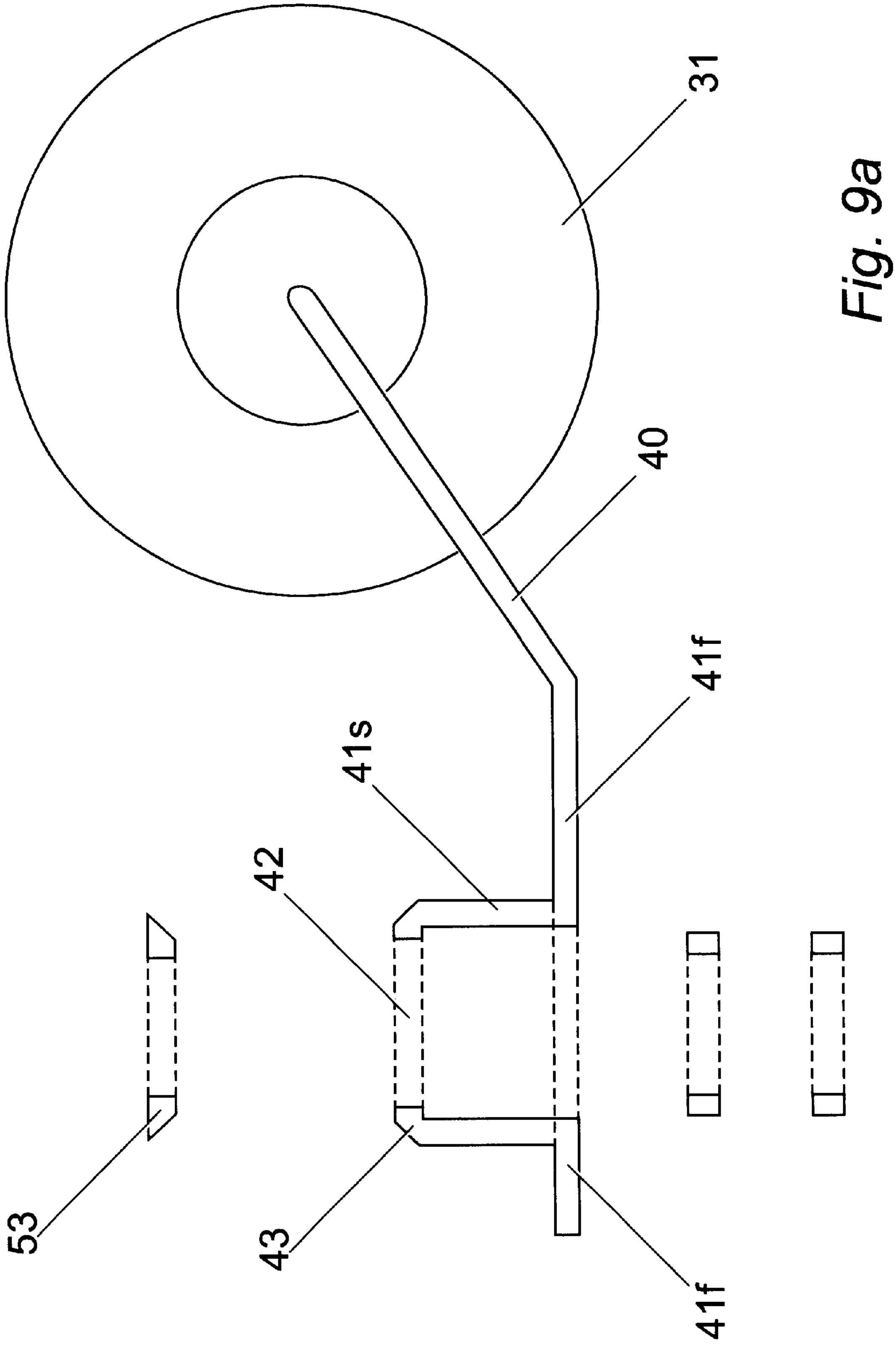
Figure 9B:
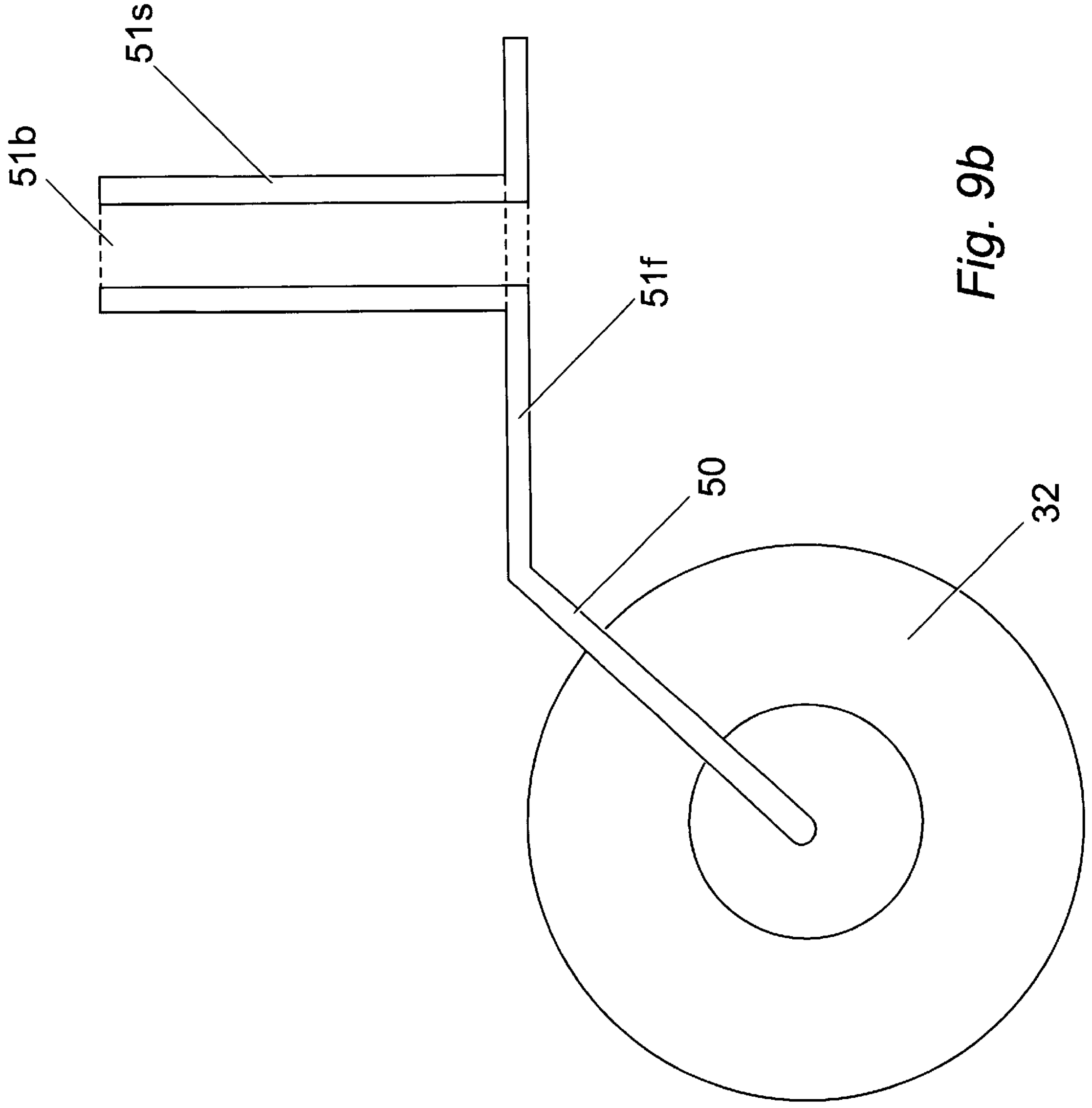
Figures 10A, 10B:
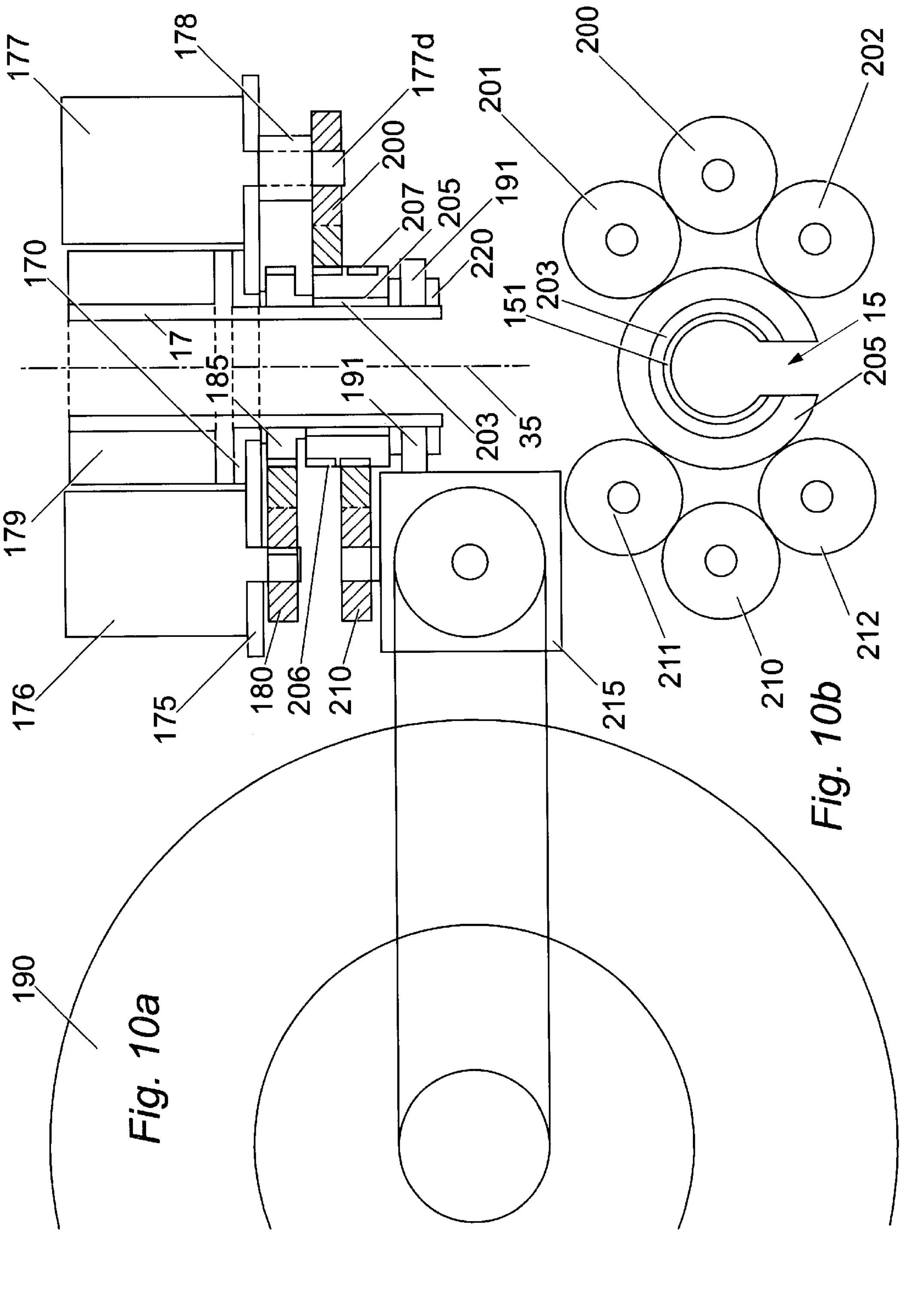
Figure 11:
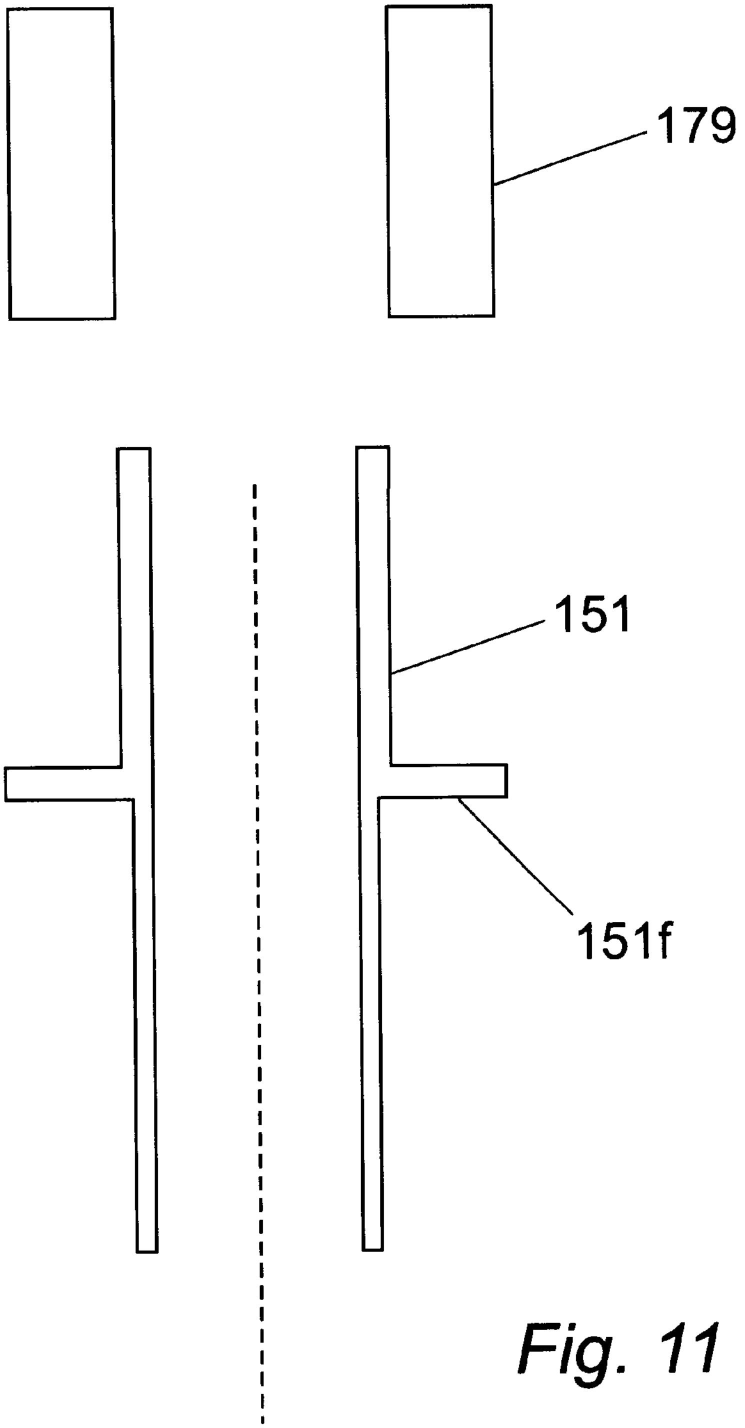
Figure 12:
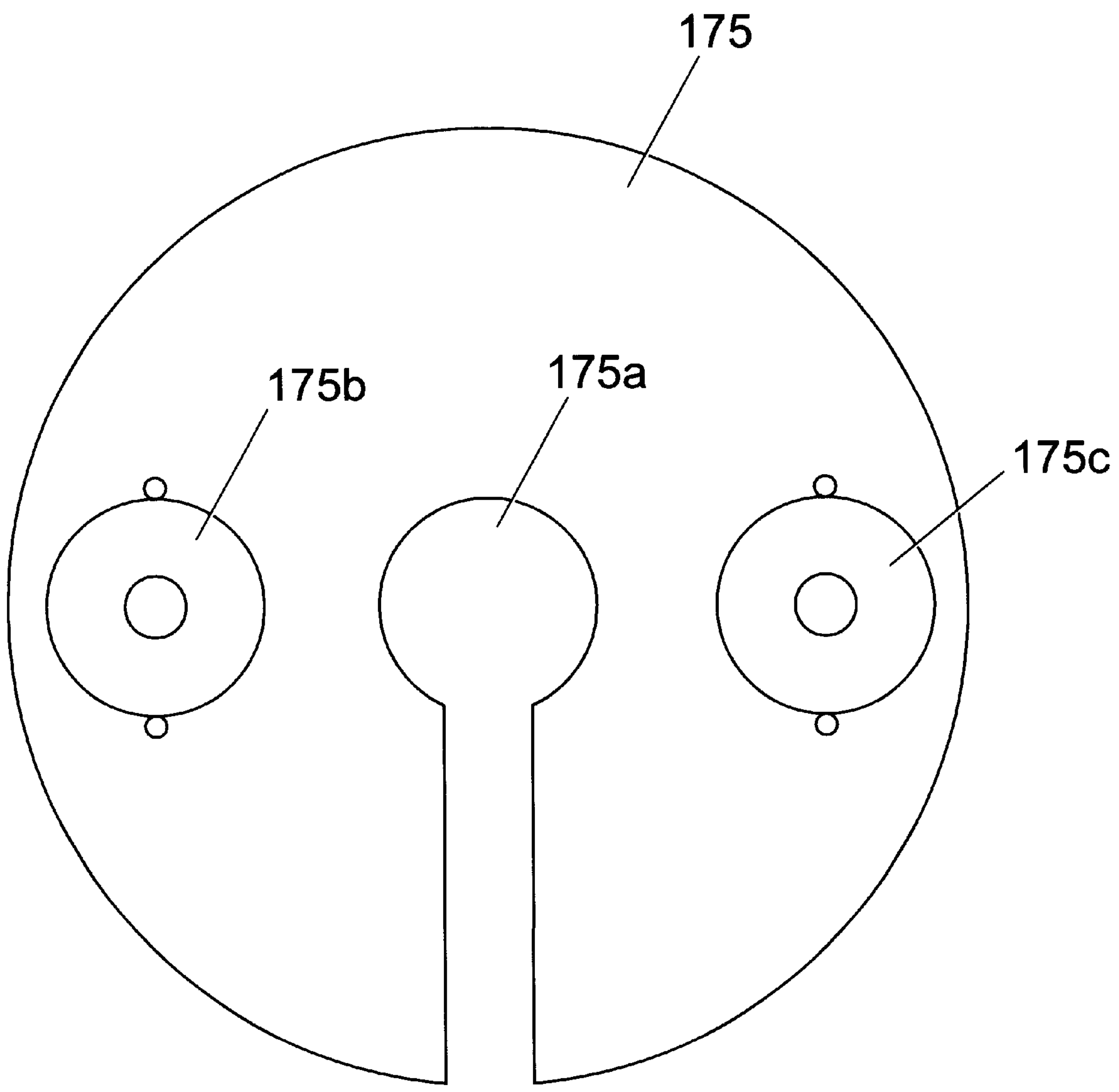
Figure 13A:
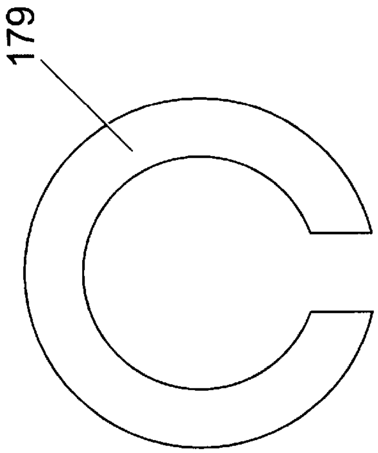
Figure 13B:
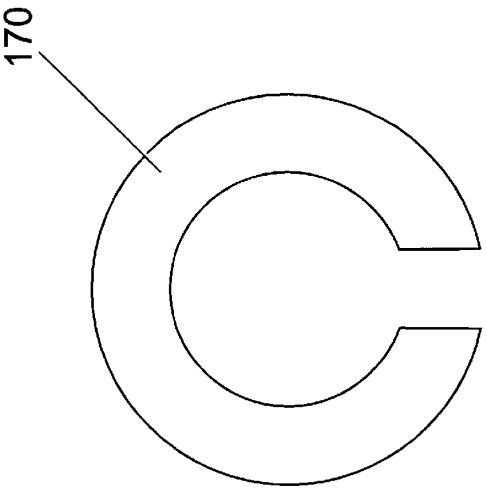
Figure 14A:
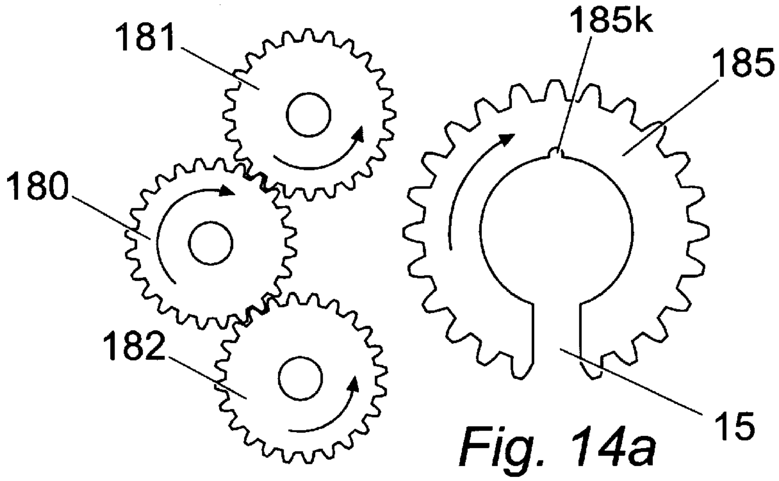
Figures 15A, 15B, 15C:
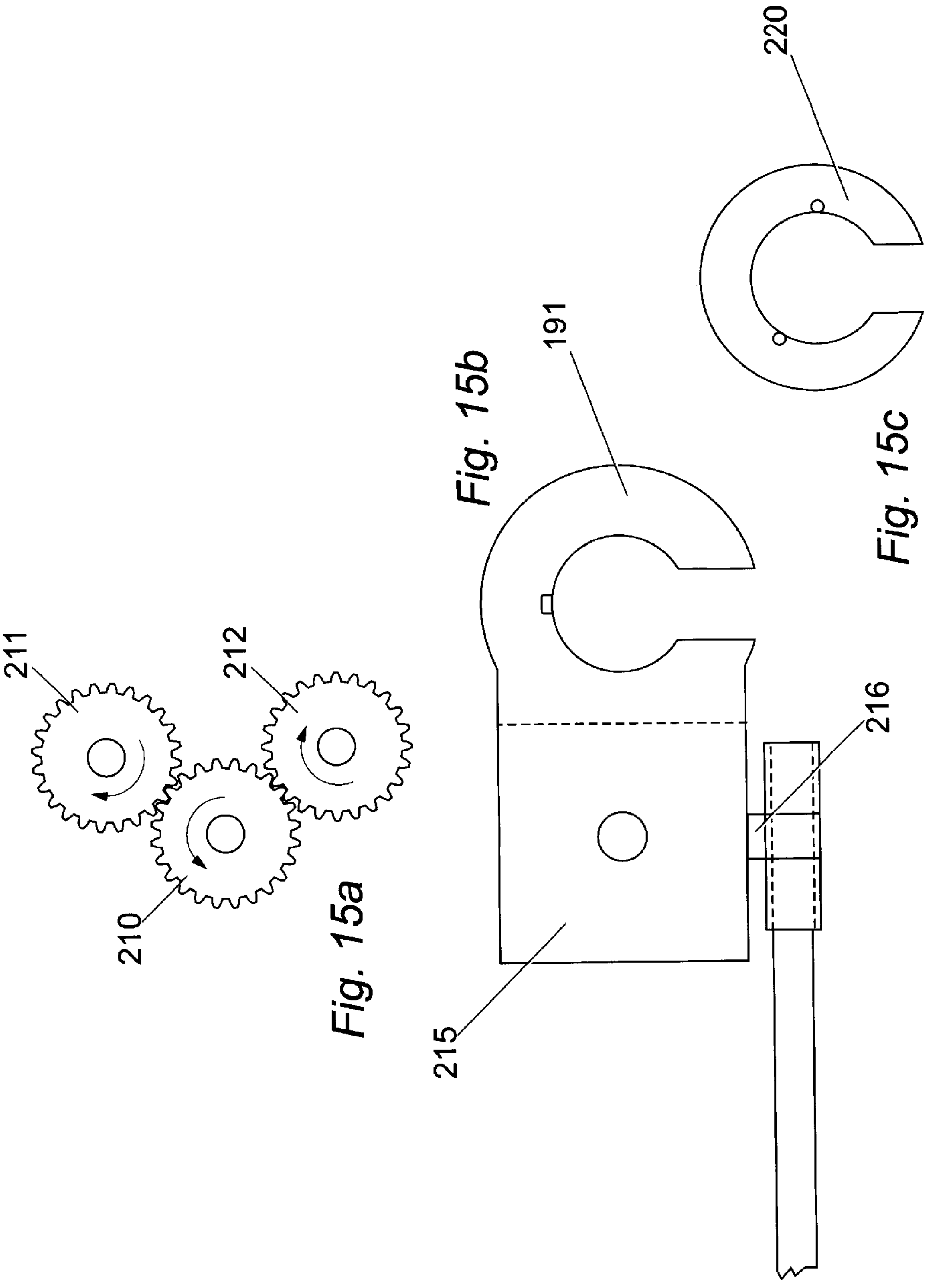

FIG. 8*a* is a schematic side view of a fifth embodiment of the invention;

FIG. 8*b* is a close up view of the FIG. 8*a* embodiment;

FIG. 8*c* shows in side sectional view some of the components of the fifth embodiment;

FIG. 8*d* shows a further component of the fifth embodiment;

FIG. 9*a* shows a side sectional view of an arm assembly of the fifth embodiment;

FIG. 9*b* shows a side sectional view of a further arm assembly of the fifth embodiment;

FIGS. 10*a* and 10*b* show a side and top view respectively of a sixth embodiment;

FIG. 11 shows a side view of a sleeve and bearing of the sixth embodiment;

FIG. 12 shows a plan view of a main support plate of the sixth embodiment;

FIGS. 13*a* and 13*b* show plan views of bearings used in the sixth embodiment;

FIGS. 14*a,* 14*b,* and 14*c* show plan views of gears used in the sixth embodiment;

FIGS. 15*a,* 15*b,* and 15*c* show plan views of further gears used in the sixth embodiment.

Figure 16:
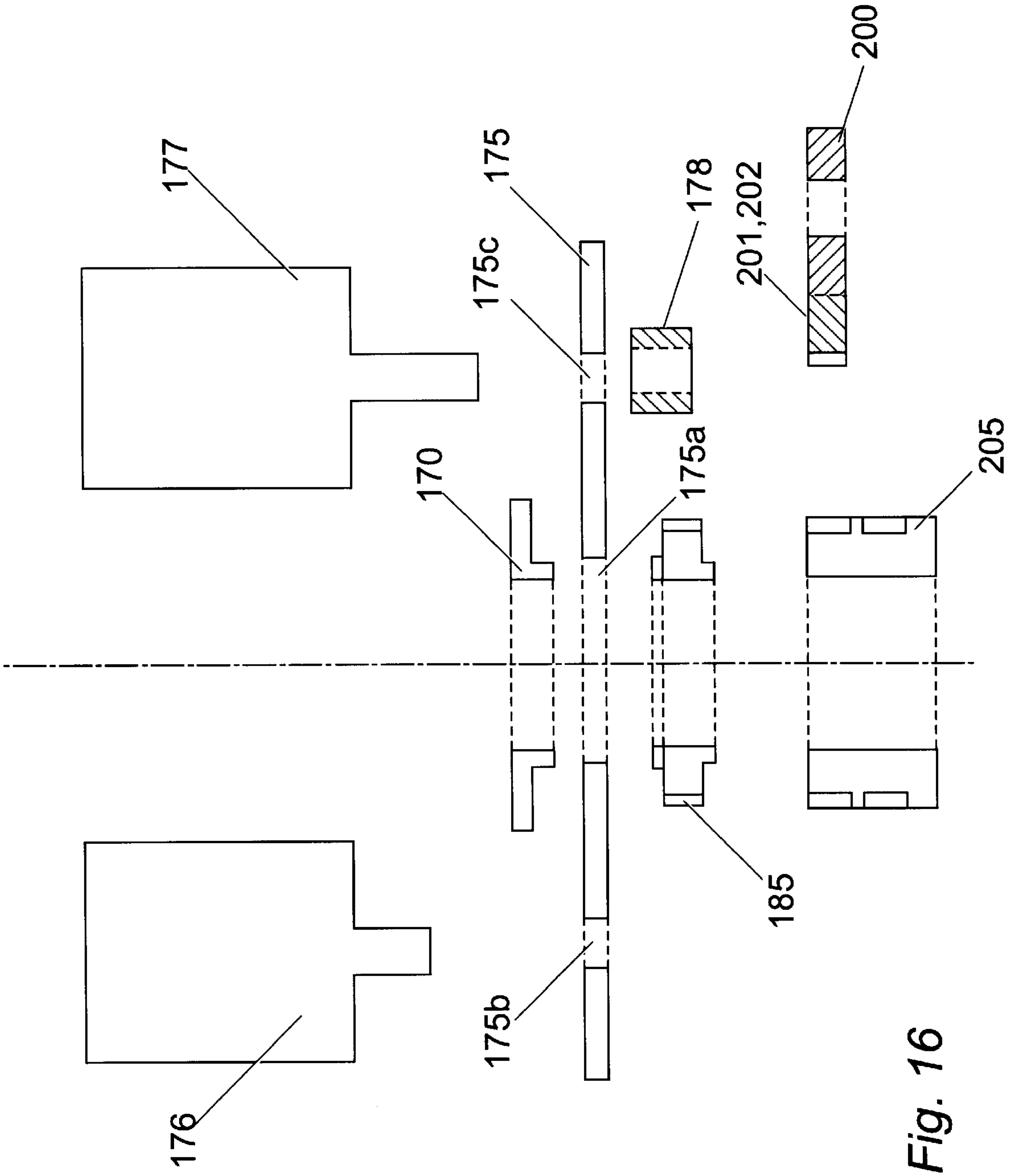
Figure 17:
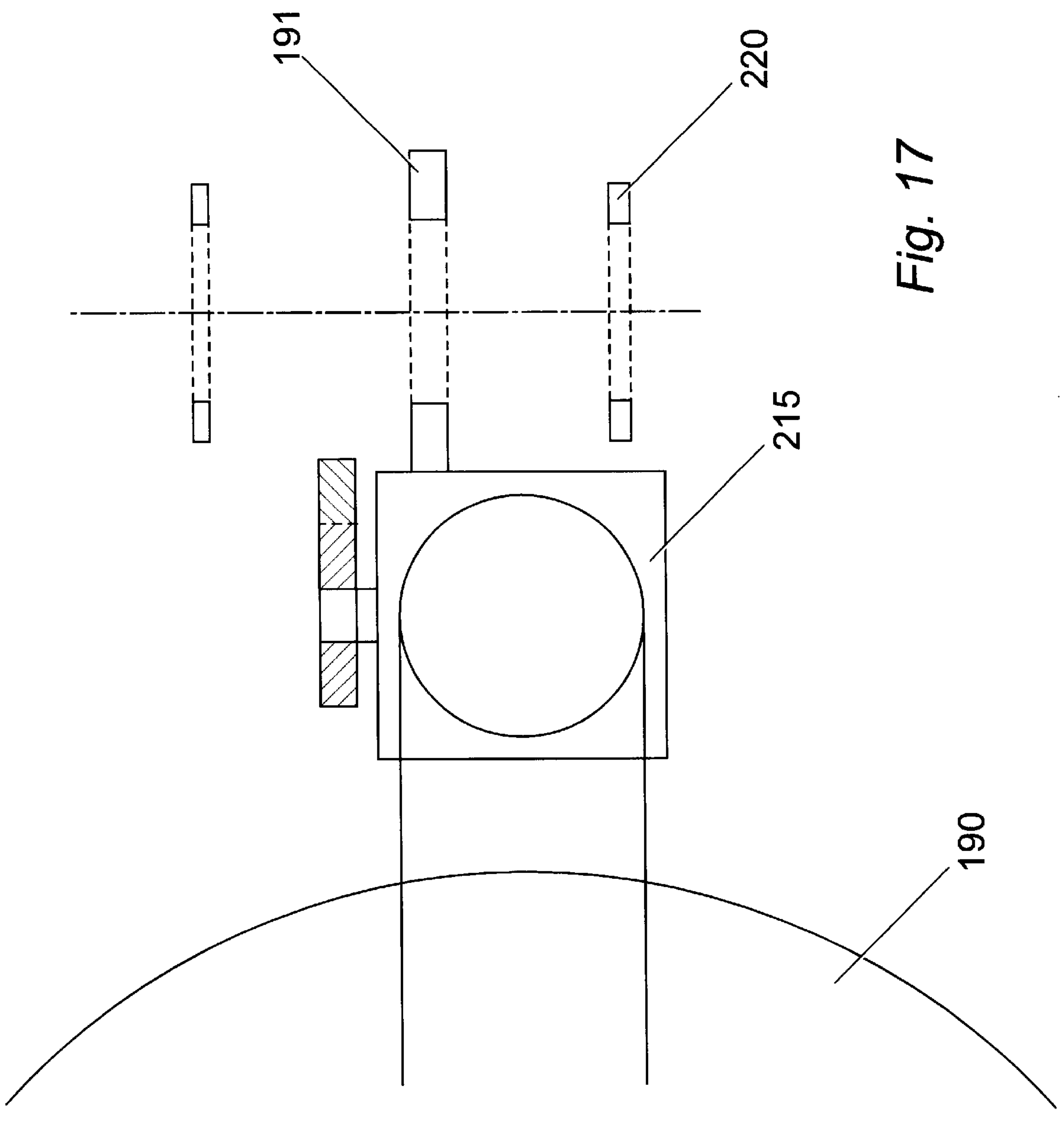

FIG. 16 shows an exploded side view of the drive train in the sixth embodiment; and FIG. 17 shows a side view of a gearbox of the sixth embodiment.

Figure 1:
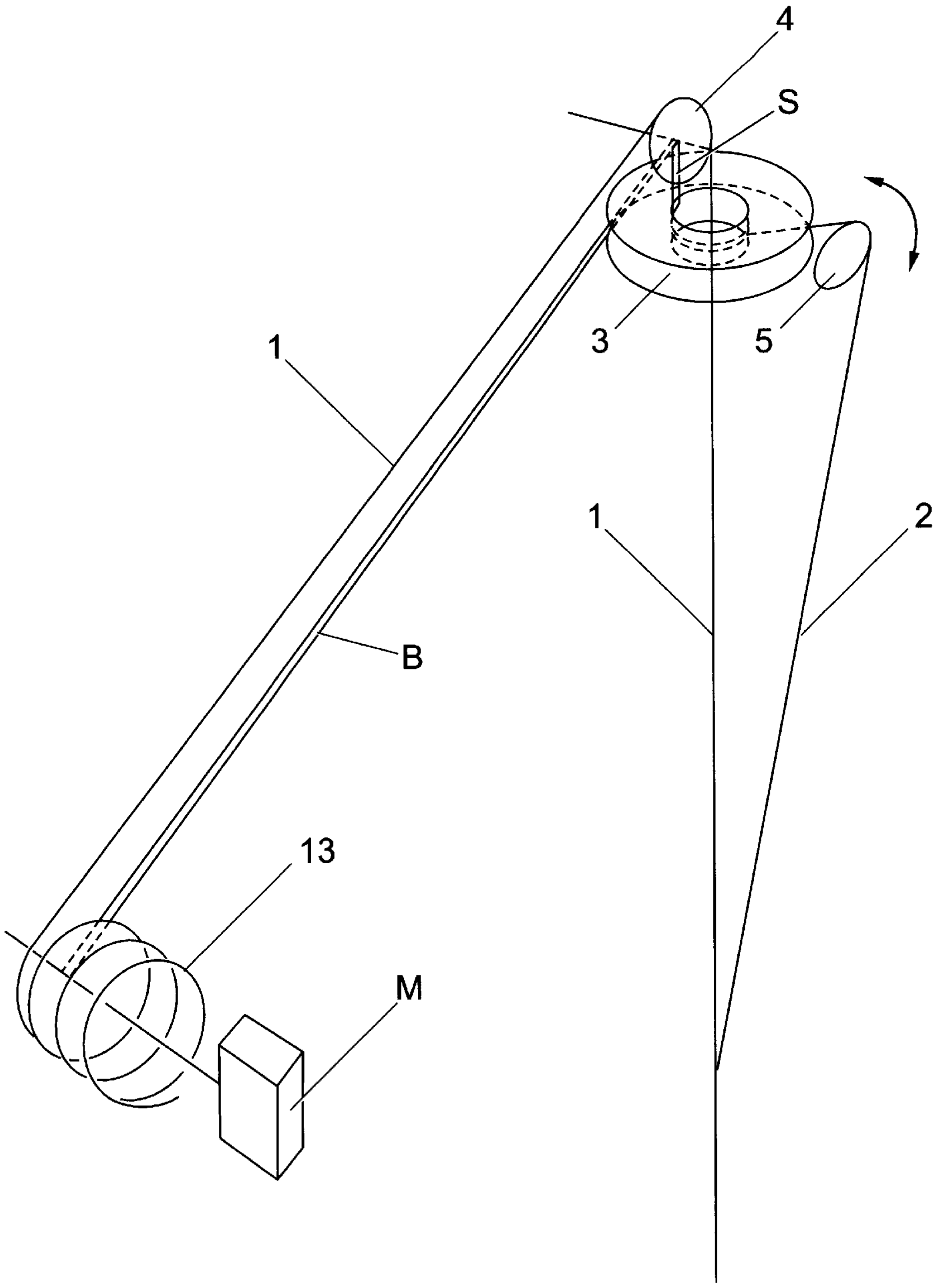
FIG. 1 is a schematic perspective view illustrating the principle of operation of a first example of the invention.

Referring to FIG. 1, a hoist rope 1 extends from a hoist rope winch 13 over a hoist rope sheave 4 to support a load (not shown) for raising and lowering.

The hoist rope 1 may be any suitable form of hoist rope such as flexible steel wire rope or synthetic fibre rope, for example of “Kevlar”. A service cable 2 is reeled on a service cable drum 3 and extends to the load via a service cable sheave 5.

The hoist rope 1 passes through a central aperture of the service cable drum 3, and the service cable sheave 5 is arranged to be driven circumferentially around the axis of the service cable 1. By coordinating the movements of the hoist rope winch 13, the service cable drum 3 and the service cable sheave 5, the service cable 2 can be wrapped helically around the hoist rope 1 as the load is lowered, and unwrapped as the load is raised. In this way, a hoist rope of any desired properties can be used in combination with any required service connection.

Figure 2:
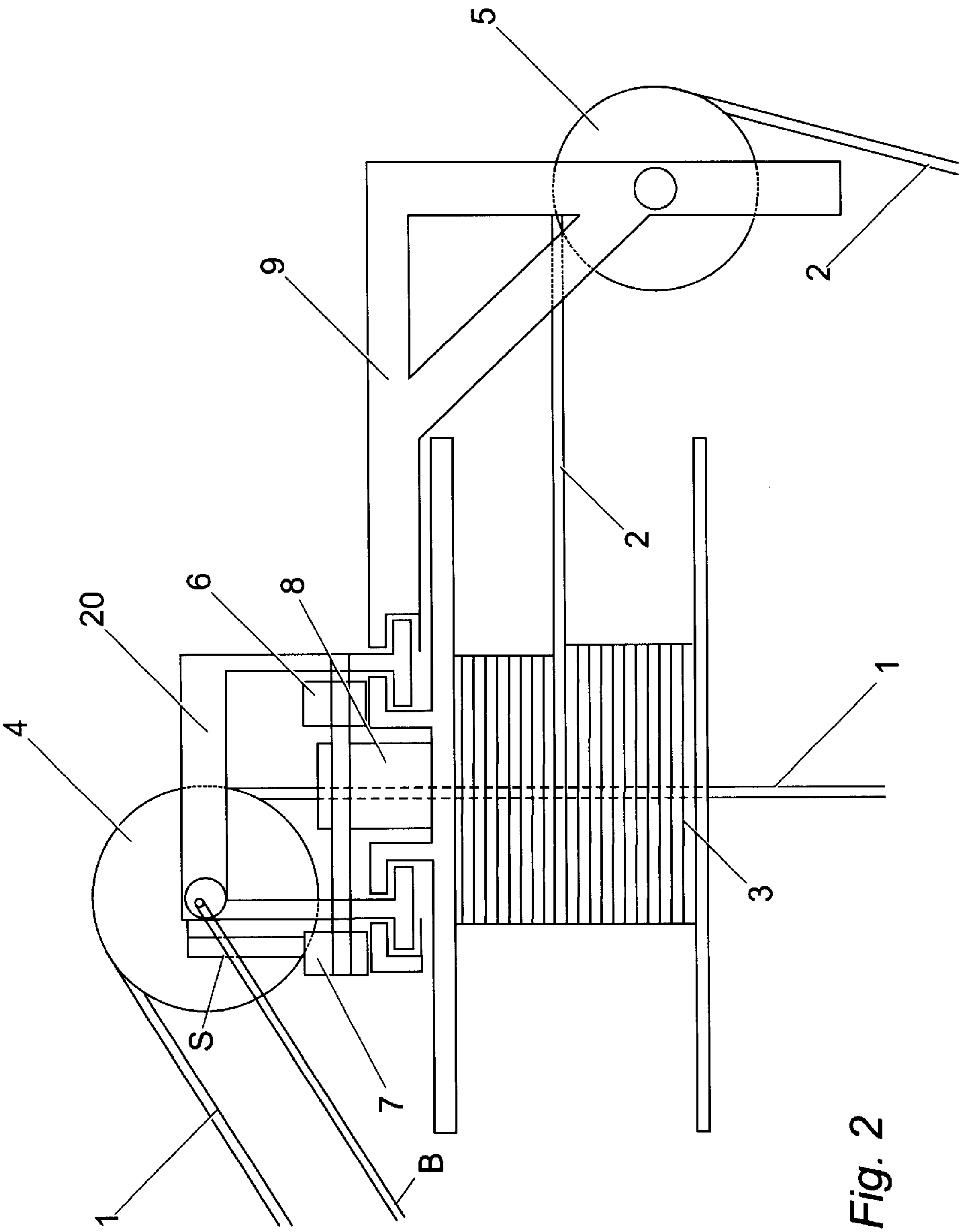
FIG. 2 is a more detailed side view, partly in section, of an apparatus used in the example of FIG. 1.

FIG. 2 shows the service cable drum 3 and associated parts in greater detail. The hoist rope sheave 4 is journalled to a fixed frame 20 which is secured to any suitable supporting structure (not shown). The service cable drum 3 is rotatably mounted on the lower part of the frame 20 and driven in rotation by a motor 6.

The inner end of the service cable 2 is connected to the appropriate service by a coupling assembly 8 which comprises a slip ring arrangement in the case of electrical or fibre optic services or a rotary coupling in the case of pneumatic or hydraulic services; such rotary couplings are well known per se.

The service cable sheave 5 is journalled on a mounting frame 9 which is rotatable about the fixed frame 20 by means of a motor 7.

FIG. 1 and FIG. 2 show an optional mechanical linkage in the form of belt B linking the shaft of the rope winch 13 to a spur gear S on the rope sheave 4. A motor M drives the rope winch 13 and transmits power via the mechanical linkages of the belt B and spur gear S to the motor 7. The motor 7 can optionally be linked to the motor 6 so that the rope winch motor M can be used to drive the winch, service cable drum and the rotation of the service cable sheave 5 to wrap the service cable 2 around the rope 1.

The service cable 2 shown in this embodiment may be a single cable or hose, or may be a specially made cable comprising a plurality of cable(s)/hose(s).

The motors 6 and 7 are driven at speeds related to the axial speed of the hoist rope 1. The speed correlation may be fixed. Preferably, however, this correlation will be controllable to alter both the length of twist (pitch) of the lay of the service cable 2 on the hoist rope 1, and the tension in the service cable 2.

Figure 3:
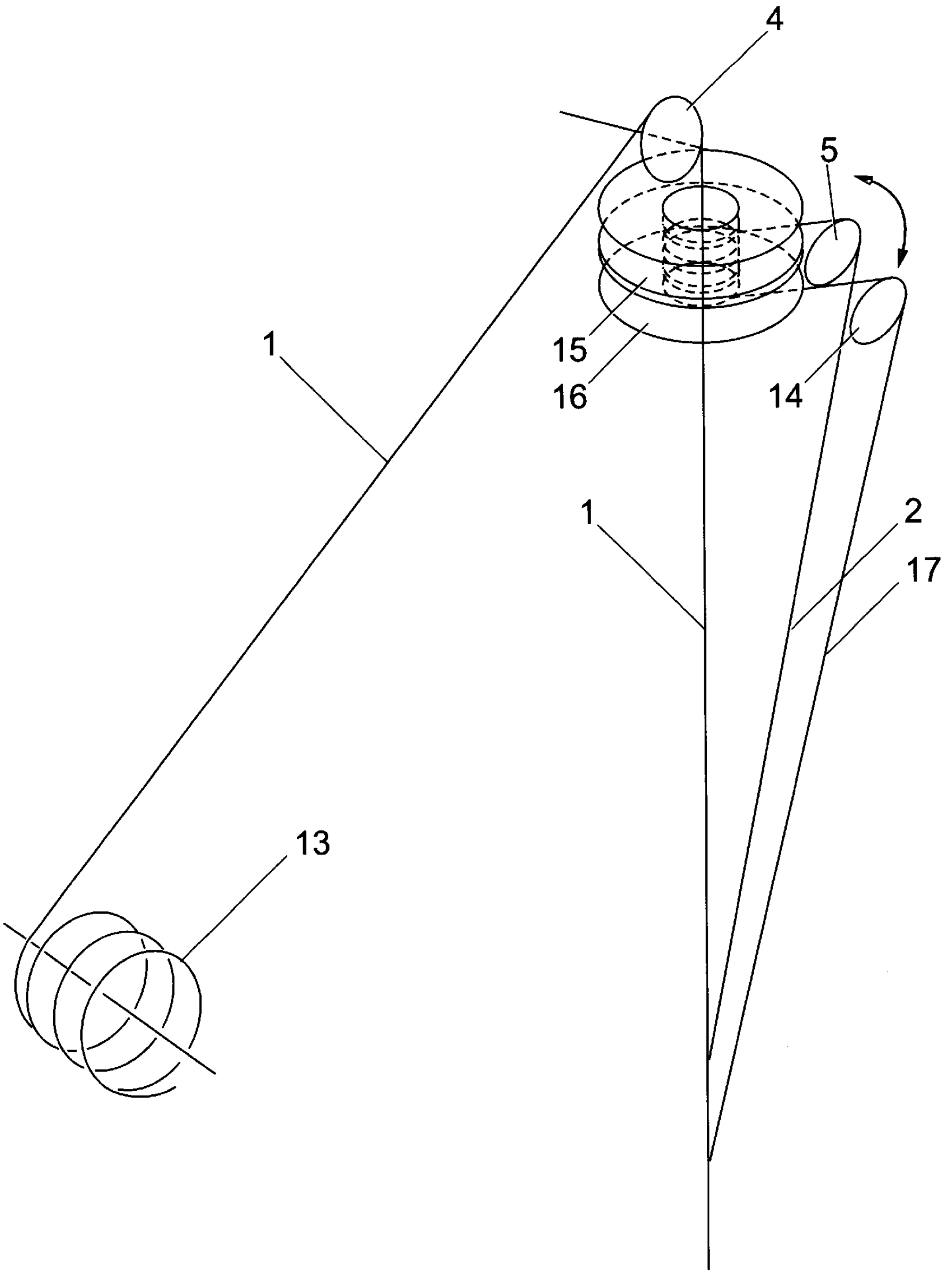
FIG. 3 is a view similar to FIG. 1 illustrating a modification of the arrangement of FIG. 1.

FIG. 3 shows a modification in which a second service cable 17 is wrapped on the hoist rope 1 along with the service cable 2. In this modification, the service cables 2, 17 are each provided with a respective storage drum 15, 16 and a respective sheave 5, 14 which may suitably be carried on a common supporting frame for rotation in unison.

The apparatus may be further modified by adding further drums and sheaves to handle more services.

Figure 4:
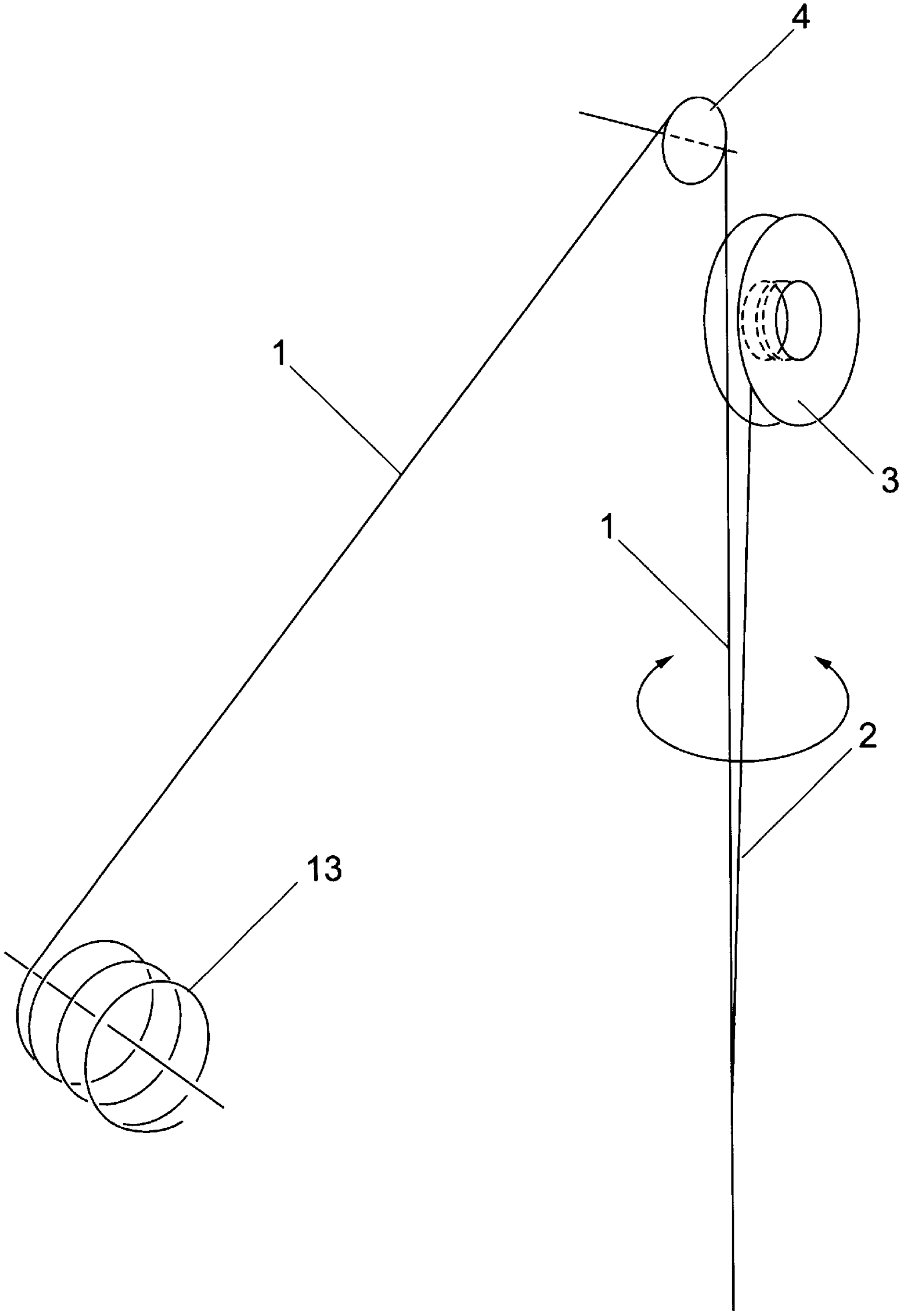
FIG. 4 is a schematic perspective view illustrating a second example of the invention.

FIG. 4 illustrates a second example in which the service cable 2 is reeled on a drum 3 and the drum 3 is itself rotated about the hoist rope 1 to achieve a helical wrap and unwrap. As shown in more detail in FIG. 5, the service cable drum 3 may be constituted by a drum 12 removably mounted on a hub motor 11 which is carried on the end of an arm 18 rotatably mounted on the fixed frame 20 and driven by a motor 10.

Figure 5:
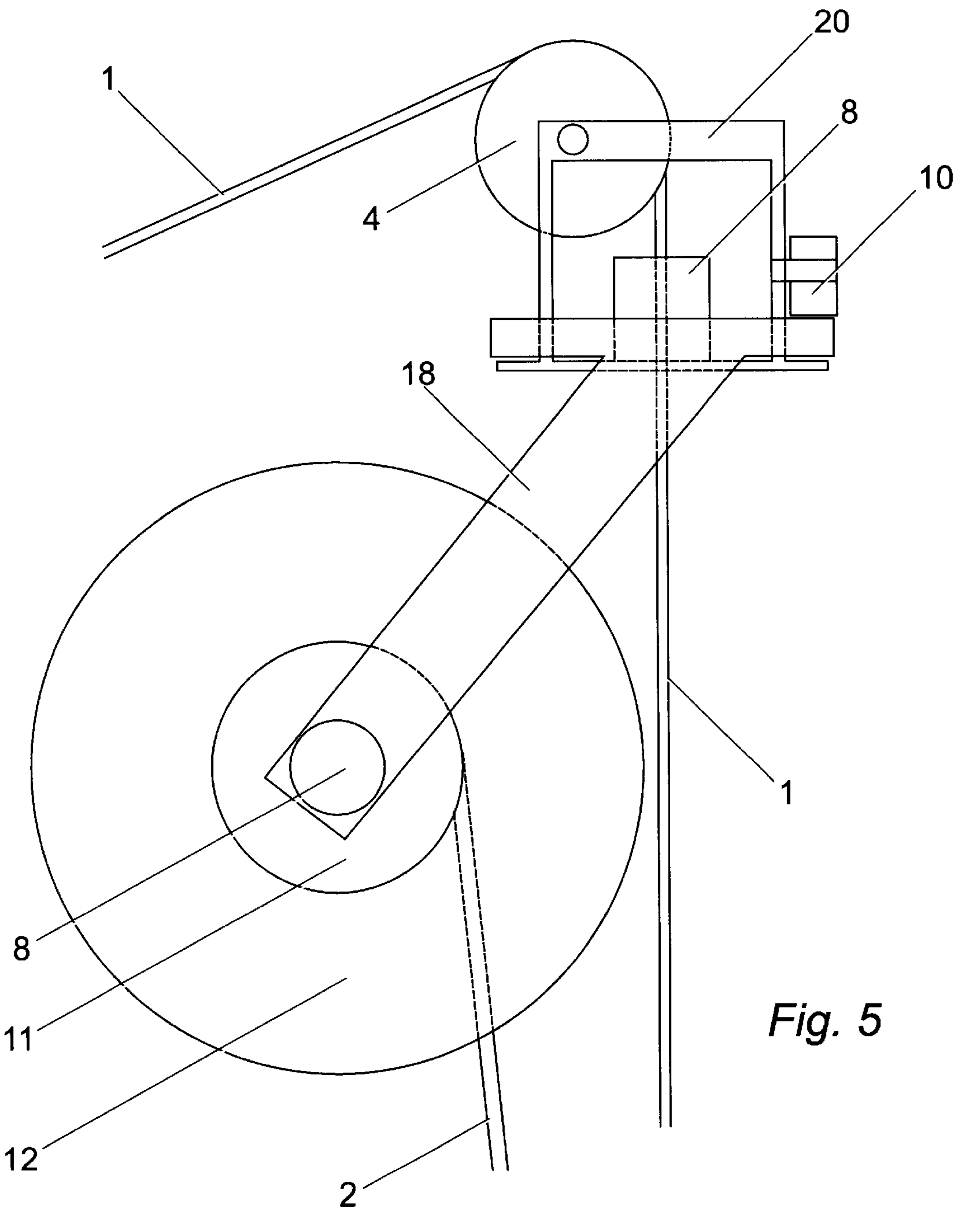
FIG. 5 is a side view of an apparatus used in the example of FIG. 4.

As with the first example, the example shown in FIGS. 4 and 5 could be modified by adding further service cable drums to be rotated by the motor 10.

Figure 6:
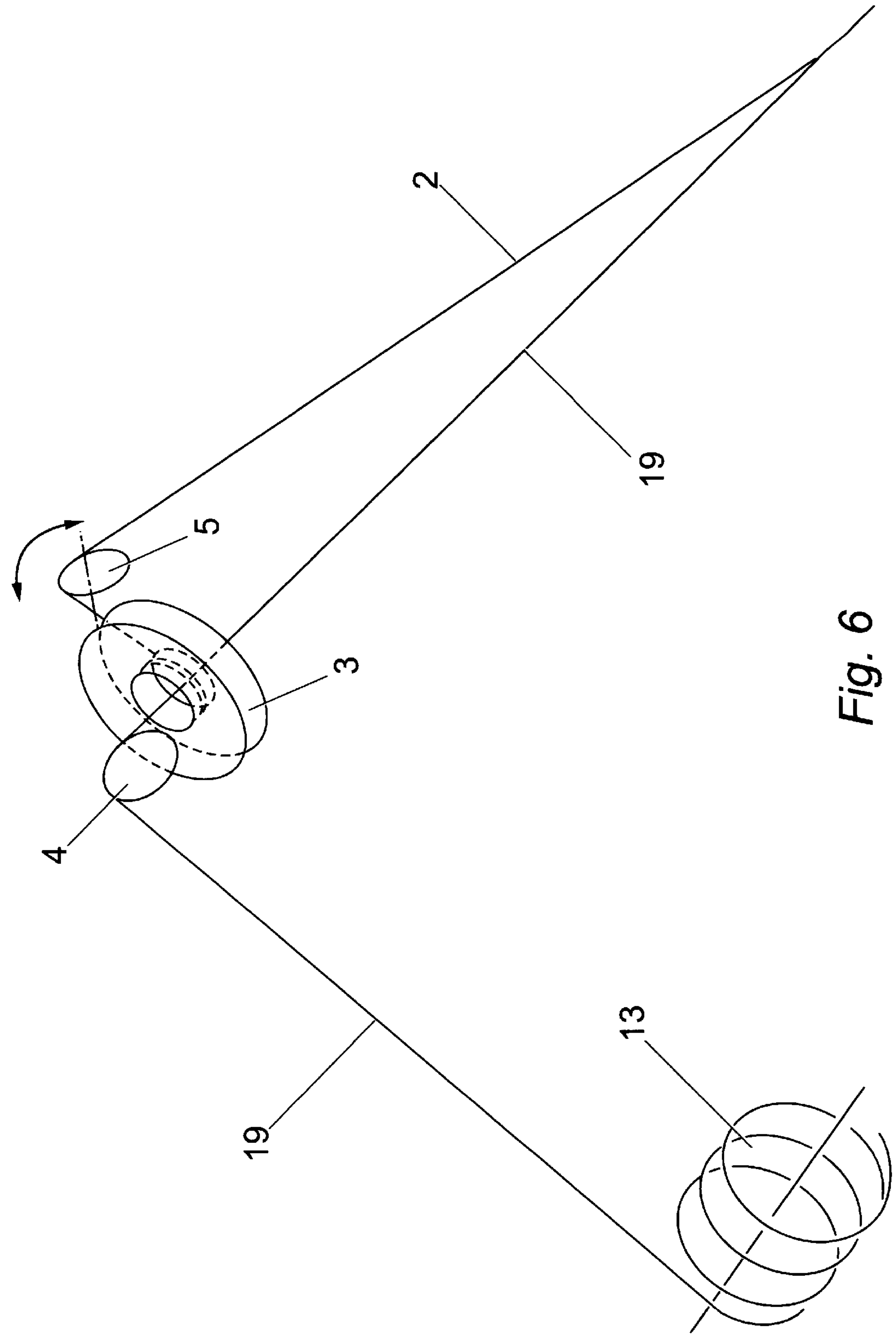
FIG. 6 is a schematic perspective view illustrating a third example similar to that of FIG. 1 but modified for towing rather than lifting.
Figure 7:
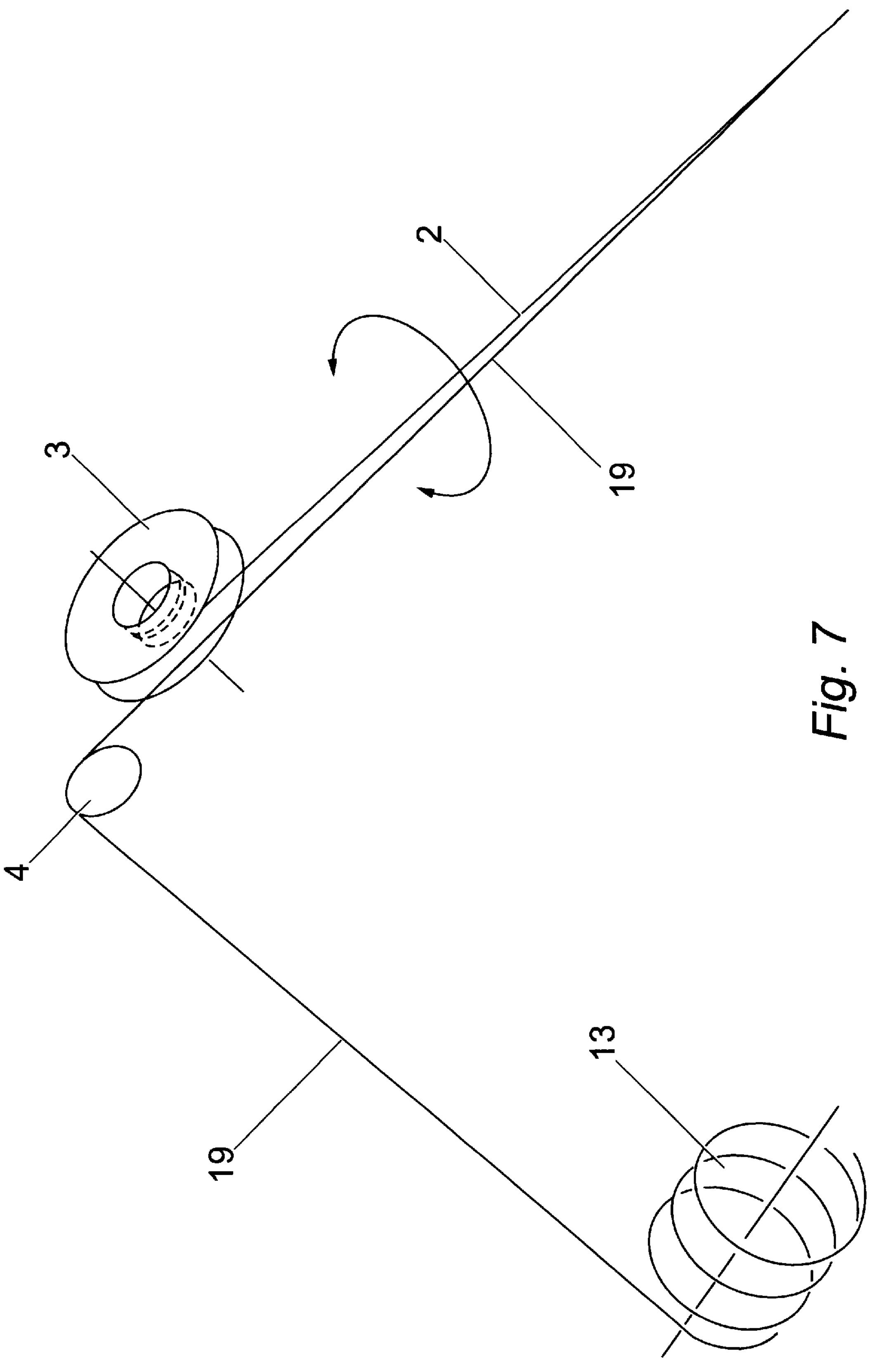
FIG. 7 illustrates a fourth example similar to that of FIG. 4 but modified for towing rather than lifting.

FIG. 6 illustrates the example of FIG. 1 modified for use in a marine towing application, for example in paying out, towing and recovering a sensor array such as a sonar sensor or seismographic surveying sensor, the sensor array being towed underwater or on the surface. The service cable drum 3 is hinged to the main structure of the towing vessel (not shown) and can be tilted to a desired towing angle by hydraulic or other mechanisms. Likewise, FIG. 7 illustrates the modification of the example of FIG. 4 for the same use, the frame carrying the mounting arm for the service cable drum 3 being hinged to the vessel and tilted to the desired angle by hydraulic or other mechanisms.

The invention may be applied to a system in which one or more service cables is applied to a load-bearing rope which itself carries a service channel in addition to fulfilling its load-bearing function. For example, the load-bearing rope could be a steel wire rope carrying electrical signals, or a rope comprising “Kevlar” load-bearing strands in combination with optical fibre cable.

FIG. 8 discloses a further embodiment of the invention having first and second drums 31 and 32 which are arranged to rotate around a load-bearing rope 35 in different directions and can wind different cables (for example a fibre optic communications cable and a high voltage power cable) in opposite directions around the central load-bearing rope 35. This has been found by the inventor to be useful particularly in applications where the load-bearing rope 35 remains slack during certain periods in the operation of the equipment. By contra-rotating the cables around the load-bearing rope they are less likely to move or become loose should the load-bearing rope 35 slacken. In addition, a fragile cable such as a fibre optic cable wound around the load-bearing rope 35 in a first direction can be overlaid by eg a high voltage power cable wound around the load-bearing rope 35 and fibre optic cable in the opposite direction, and this can also afford some protection to fragile cables such as fibre optics etc.

In the FIG. 8 apparatus, two different cables wound onto respective drums 31 and 32 are paid out while the drums are rotated around the load-bearing rope 35. Drum 31 is mounted on an arm 40 connected to an arm assembly 41 having a top hat structure with a top surface, and an annular flange 41*f* provided at the lower end of side walls 42*s* (shown in FIG. 9). The arm assembly 41 has a central aperture 42 in its top surface through which the load-bearing rope 35 passes, and has an annular bevel gear 43 cut into the outer edge of its top surface.

A second drum 32 is supported on a further arm 50 also connected to an arm assembly 51 having a similar top hat structure and shown in FIG. 9*b*. Arm assembly 51 comprises a lower annular flange 51*f* with a sleeve 51*s* attached thereto and having a central bore 51*b* extending through the sleeve 51*s* and through the annular flange 51*f*. A bevel gear 53 (shown in FIG. 9*a*) is manufactured separately but located over the sleeve 51*s* and fixed in place by any suitable means, for example by welding or bolting or other fixing means after the apparatus has been assembled.

The FIG. 8 apparatus is assembled by locating the arm assembly 41 and a pair of bearing rings 44 over the sleeve 51*s*, so that the arm assembly 41 is capable of rotating on the bearings around the sleeve 51*s*. A slip ring 55 for transmitting electric or hydraulic power via the rotating arm assembly 41 and arm 40 to the drum 31 is then located over the ring 41 to rest on the flange 41*f*. Slip rings suitable for this purpose are known and suitable electrical, fibre optic and fluid rotary union slip rings are available eg from Focal Technologies Inc of 40 Thornhill Drive, Unit 7 Dartmouth, Nova Scotia, Canada B3B 1S1 Such slip rings for electrical, fibre optic and hydraulic power transmission are clearly readily available and will not be described further here.

Bevel ring 53 is then offered to the sleeve 51*s* and attached thereto in opposite orientation to bevel gear 43. A further slip ring 56 is located on top of the bevel ring 53 in order to transmit power from a stationary source via the sleeve 51*s*, flange 51*f* and arm 50 to the drum 32.

Bearing rings 45 are then located over the sleeve 51*s* and a support bracket 58 is placed around them and attached to the ship or other structure from which the apparatus is to be used. The support bracket 58 likewise has an annular flange 58*f* and an aperture 58*a* for the sleeve 51*s*. A top ring 60 having a central aperture for the through passage of the rope 35 is then bolted to the upper face of the sleeve 51*s*, and secures the annular apparatus together around the central sleeve 51*s*.

On flange 58*f* of the support bracket 58 a motor 62 drives a shaft 63 to a gearbox 64 disposed below the bracket 58 but above the lower slip ring 55. The motor 62 and gearbox 64 transmit power via shaft 65 between the slip rings to a bevel gear drivehead 66. Bevel drivehead 66 engages bevel rings 53 and 43 and drives them in opposite directions simultaneously. By a single force exerted from the motor 62, the arms 40 and 50 and therefore the drums 31 and 32 can thus be driven in opposite contra-rotating directions around the central axis of the load-bearing rope 35 as it is payed out (described previously).

The bearings 44, 45 support the arm assemblies 41 and 51 so that they can rotate within the main support bracket 58 attached to the ship or other structure.

The winch drums 31 and 32 can hoist and lower cables by use of electric or hydraulic power transmitted through the slip rings 55, 56. Conventional power cables (or hydraulic conduits if hydraulic motors are used) can be passed through the drum support arms 40 and 50 from the inner half of the slip ring adaptors which will remain stationary in relation to the arms 40, 50.

Although the embodiment shown in FIGS. 8 & 9 is driven through motor 62 and bevel gear 66, the apparatus could also be driven from the sleeve 51*s* which could in certain embodiments protrude out of the securing plate and be rotated using belts, gears, chains or similar mechanisms The bevel gear arrangement shown in FIGS. 8 & 9 would in that embodiment still remain to contrarotate the drums under the power applied to the sleeve 51*s* and therefore bevel gear 53.

The drums could also be driven independently using two separate motors. One motor at the top of the sleeve 51*s* as mentioned above could drive the arm 50, and the motor 62 could drive the arm assembly 41 through the bevel gear 66. That embodiment would not require the additional bevel ring 53, which could be removed.

A further improved variant of the invention is shown in the remaining FIGS. 10 to 17, Components of the mechanism shown in these figures are slotted so that the apparatus can be deployed or recovered without first having to pass the load-bearing rope through the centre of the mechanism. The load-bearing rope can instead be removed or replaced within the mechanism during any part of the operation. This is particularly useful with heavy and oversized pieces of equipment. The slots can be filled by removable segments which are replaced after the load-bearing rope has been located within the mechanism. This has the advantage of allowing more traditional slip rings and the segment could be located easily within a tapered notch. Single gear driving would then be possible, but it is also equally possible to drive a slotted mechanism by two or more gears as shown in the drawings and described below. The embodiment shown and described is not affected by the notches, and these allow the load-bearing rope to be removed or placed within the mechanism as required without removal of the notch filling segment. More than one drive shaft is preferable to reduce the possibility of contact being lost with the centre drive when the notch thereon passes the driving wheel. In the embodiments shown, all of the parts which rotate around the load-bearing rope 35 are slotted.

Referring now to FIGS. 10 to 17, a central rotating notched sleeve 151, having an annular flange 151 on its outer surface is provided. The sleeve 151 is notched at 15 to allow radial passage of the rope 35 through the notch 15 into the axial bore. An annular thrust bearing 170 separates the lower surface of the flange 151*f* from a main support plate 175 through which it passes via a central aperture 175*a*, also notched The main support plate 175 also has two side apertures 175*b* and *c* through which the drive shafts of motors 176 and 177 pass.

A main support bearing 179 surrounds the outer surface of the sleeve 151 above the flange 151*f*.

Motor 176 drives winding gear 180 which is used to drive the winding of the rope around the central load-bearing rope 35. Winding gear 180 is a circular gear driving two further gears 181, 182 in the same direction. Gear train 180, 181, 182 drives a spur gear 185 also having a notch 15 coinciding with the notch 15 in the sleeve 151, and keyed to the sleeve 151 by means of a keyway 185*k*. Rotation of gear train 180, 181, 182 therefore drives spur gear 185 and (by virtue of the keyway) sleeve 151. Since the gears 181 and 182 are spaced apart, the notching of the assembly of the spur gear 185 and sleeve 151 does not affect power transmission to the sleeve 151, since even if the notch 15 is adjacent one of the gears 181, 182, the other will still be contacting the teeth and will transmit power to the sleeve 151 for the time taken for the notch 15 to pass the gear 181 or 182 as the case may be.

A drum 190 is carried on a support arm 191 attached to the lower end of the sleeve 151 and therefore rotation of the drive train 180, 181, 182 by the motor 176 drives rotation of the arm 191 around the central axis of the load-bearing rope, thereby winding the cable on the drum 190 axially around the load-bearing rope 35 as it is payed out as described previously.

Hoist and payout of the cable on the drum 190 is driven by motor 177 through the drive train to be described below. Motor 177 has a driveshaft 177*d* passing through the aperture C in the main support plate 175. A spacer 178 spaces a gear 200 driven by shaft 177*d* from the lower surface of the main support plate 175. Gear 200 is part of a drive train 200, 201, 202 similar to the drive train 180, 181, 182 as previously described. Drive train 200, 201, 202 drives the rotation of a notched spur gear 205 having a slot 15 and located around the sleeve 151 on a bearing 203. The spur gear 205 is able to rotate relative to the sleeve 151, and is driven around the sleeve by the operation of the drive train 200, 201, 202. The drive train 200, 201, 202 meshes with an upper raw of teeth 206 on the gear 205. Spur gear 205 also carries a lower row 207 of teeth which are clearly also driven in rotation by operation of the drive train 200, 201, 202 A further set of gears 210, 211, 212 mesh in a fashion similar to that described for the gears 180, 181, 182 with the lower teeth 207 of the spur gear 205. The gear 210 is located on a drive shaft connected to a right angled gearbox 215 where a bevel gear or similar arrangement drives rotation of a perpendicular second shaft 216, which through a pulley wheel drives the rotation of the drum 190 around its own axis by a belt, chain or similar such means. This allows the motor to hoist in or lower the power or signal cable on the drum. The gear box 215 is mounted on the drum support arm 191, which is held in place by a notched securing nut 220.

The locating C nut 220 secures the winch support arm, the double row toothed gear 205 the single row toothed gear and two shims, which all slide up onto the lower half of the central rotating notched cylinder 17.

More than one drum can be provided on the embodiment described, and where two drums are provided, they can be rotated in opposite directions.

The central rotating notched cylinder is held in position by the thrust bearing and the main support bearing within which it can rotate freely.

The main support plate is attached to the ship or other structure and provides the support for the motors and the bearing housings for the main support bearing and thrust bearing.

All components preferably have a notch cut in them to allow the load-bearing rope to be swung into the mechanism. By use of the motor to rotate the winch drum around the load-bearing rope the central rotating notch can be lined up with the notch in the bearings and the main support plate. Using the motor to rotate the gear its notch can also be aligned and the load-bearing rope can either be placed within the mechanism or removed from it.

Figure 14C:
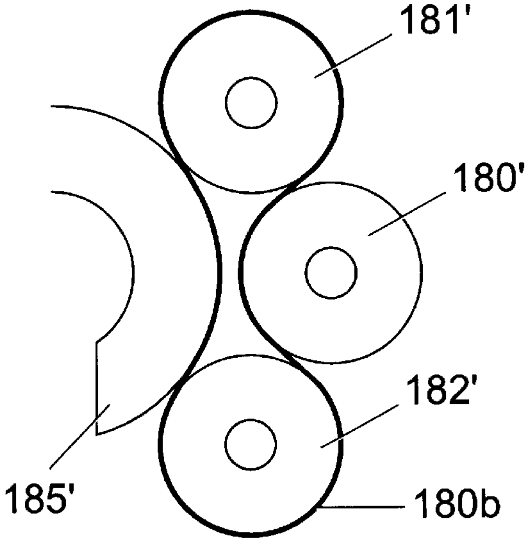
Figure 14B:
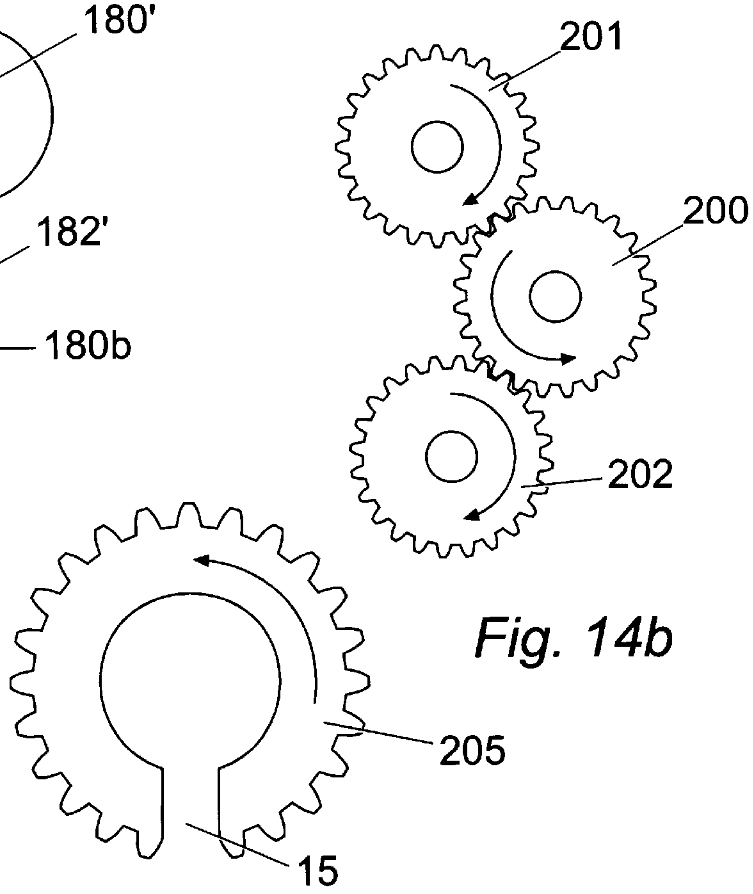

The teeth on the gears 180; 181; 182 etc can be replaced by a pulley system such as that shown in FIG. 14*c* which uses a notched belt 18S*b* running on gears 180'; 181'; 182'driving gear 185'.

The motors used for driving any of the presently described embodiments can be of any suitable type. Conventional motors available for many years are eminently suitable, and any standard electric or hydraulic motors available for over 15 years by any of the manufacturers Charlin, Eaton, White, Mannesmann Rexroth, Hawker Sidley and many others are suitable. various different kinds of motors available for the winch and frame driving motors etc will be well known to one of moderate skill in the art.

Other modifications may be made within the scope of the invention.

What is claimed is:

1. Apparatus for use in handling a load, the apparatus comprising a load-bearing rope, a mechanism for paying out and recovering the rope, at least one service cable drum for holding a service cable with a length of the service cable extending therefrom, and a wrapping device for rotating said length of service cable around the rope as the rope is payed out to wrap the service cable around the rope, and to unwrap the service cable from the rope as the rope is recovered, wherein the rope is a fiber rope.

2. Apparatus according to claim 1, wherein there are a plurality of service cables each extending from a respective service cable drum.

3. Apparatus according to claim 1, wherein the mechanism for paying out and recovering the rope comprises a rope sheave and a rope winch, and wherein the rope passes from the rope winch over the rope sheave and thereafter extends to the load along a substantially straight axis.

4. Apparatus according to claim 3, wherein the wrapping device comprises the or each service cable drum being arranged for rotation about a drum axis which coincides with said substantially straight axis along which the rope extends.

5. Apparatus according to claim 4, wherein the or each service cable drum has a central aperture through which the load-bearing rope passes.

6. Apparatus according to claim 3, comprising a service cable sheave rotatably mounted on the apparatus and capable of movement in a circular path around the substantially straight axis, and wherein the length of service cable passes over the service cable sheave.

7. Apparatus according to claim 3, having a structural member upon which the or each service cable drum is rotatable, the or each structural member being arranged for movement in a circular path about said substantially straight axis.

8. Apparatus according to claim 3, wherein the rope winch, the or each service cable drum and the wrapping device each have a respective driving motor.

9. Apparatus according to claim 3, wherein the rope winch, the or each service cable drum and the wrapping device are driven by a single source through appropriate mechanical linkages.

10. Apparatus according to claim 1, having at least two service cable drums on respective service cable sheaves, the two service cable sheaves being capable of rotation in opposite directions to one another.

11. Apparatus for use in handling a load, the apparatus comprising a load-bearing rope, a mechanism for paying out and recovering the rope, at least one service cable drum for holding a service cable with a length of the service cable extending therefrom, and a wrapping device for rotating said length of service cable around the rope as the rope is payed out to wrap the service cable around the rope, and to unwrap the service cable from the rope as the rope is recovered, the apparatus having at least one slot to facilitate attachment of the apparatus to the load-bearing rope.

12. Apparatus as claimed in claim 11, wherein the or each slot extends axially on one or more components of the apparatus.

13. Apparatus as claimed in claim 11, wherein at least one component having a slot is driven in rotation by a drive train having more than one point of contact with said at least one component.

14. Apparatus as claimed in claim 13, wherein the drive train comprises at least two transmission gears which contact said at least one component at spaced-apart locations.

15. Apparatus as claimed in claim 13, wherein the drive train comprises a belt driven by a driver and contacting said at least one component in at least two spaced-apart locations.

16. A method for use in handling a load, the method comprising paying out a load-bearing rope and wrapping a service cable around the rope as it is payed out, and subsequently unwrapping the service cable from the rope as the rope is recovered, wherein the rope is a fiber rope.

17. A method according to claim 16, wherein a plurality of service cables are wrapped around the rope as the rope is payed out.

18. A method as claimed in claim 16, including the step of wrapping two service cables around the load-bearing rope in opposite directions.

19. A method as claimed in claim 18, wherein one service cable is wrapped over the other.

20. A method for use in handling a load, the method comprising paying out a load-bearing rope and wrapping a service cable around the rope as it is payed out, and subsequently unwrapping the service cable from the rope as the rope is recovered, including the steps of attaching the load-bearing rope to a mechanism for paying out and recovering the load-bearing rope, attaching the load-bearing rope to the load, and subsequently attaching to the load-bearing rope apparatus for wrapping the service cable around the load-bearing rope, wherein the wrapping apparatus has at least one axial notch through which the load-bearing rope passes as the wrapping device is being attached to the load-bearing rope.

21. Apparatus for use in handling a load, the apparatus comprising a load-bearing rope, a mechanism for paying out and recovering the rope, at least one service cable drum for holding a service cable with a length of the service cable extending therefrom, and a wrapping device for rotating said length of service cable around the rope as the rope is payed out to wrap the service cable around the rope, and to unwrap the service cable from the rope as the rope is recovered, wherein said at least one service cable drum orbits around the load-bearing rope.

22. Apparatus according to claim 21, wherein there are a plurality of service cables each extending from a respective service cable drum.

23. Apparatus according to claim 21, wherein the mechanism for paying out and recovering the rope comprises a rope sheave and a rope winch, and wherein the rope passes from the rope winch over the rope sheave and thereafter extends to the load along a substantially straight axis.

24. Apparatus according to claim 21, having a structural member upon which the or each service cable drum is rotatable, the or each structural member being arranged for movement in a circular path about said substantially straight axis.

25. Apparatus according to claim 21, having at least two service cable drums being capable of orbital rotation in opposite directions to one another.

26. A method for use in handling a load, the method comprising paying out a load-bearing rope and wrapping a service cable around the rope as it is payed out, and subsequently unwrapping the service cable from the rope as the rope is recovered, wherein the service cable is paid out and recovered onto a service cable drum, which orbits the load bearing rope.

27. A method according to claim 26, wherein a plurality of service cables from respective service cable drums are wrapped around the rope as the rope is payed out.

28. A method as claimed in claim 27, wherein one service cable is wrapped over another.

29. A method as claimed in claim 26, including the step of wrapping two service cables around the load-bearing rope in opposite directions.

30. Apparatus for use in handling a load, the apparatus comprising a load-bearing rope, a mechanism for paying out and recovering the rope, at least two service cable drums for holding respective service cables with a length of service cable extending from each drum, and a wrapping device for rotating said lengths of service cable around the rope as the rope is payed out to wrap the service cables around the rope, and to unwrap the service cables from the rope as the rope is recovered.

31. Apparatus according to claim 30, having a structural member upon which each service cable drum is rotatable, each structural member being arranged for movement in a circular path about the rope.

32. Apparatus according to claim 30, wherein the rope winch, each service cable drum and the wrapping device each have a respective driving motor.

33. Apparatus according to claim 30, wherein the rope winch, each service cable drum and the wrapping device are driven by a single source through appropriate mechanical linkages.

34. Apparatus according to claim 30, the two service cable sheaves being capable of rotation in opposite directions to one another.

35. A method for use in handling a load, the method comprising paying out a load-bearing rope and wrapping a first service cable and a second service cable around the rope as it is payed out, and subsequently unwrapping the first and second service cables from the rope as the rope is recovered.

36. A method as claimed in claim 35, including the step of wrapping said first and second service cables around the load-bearing rope in opposite directions.

37. A method as claimed in claim 35, including the step of wrapping one service cable over the other.

38. A method for use in handling a load, the method comprising paying out a load-bearing rope and wrapping a service cable around the rope as it is payed out, subsequently attaching a load to the load-bearing rope, and lifting the load by recovering the load-bearing rope while unwrapping the service cable from the load-bearing rope.

* * * * *